Nov. 25, 1958     M. VON TARNIK     2,861,347

RETRACTABLE PLUG OR THREAD GAUGE

Filed Feb. 4, 1957

INVENTOR

Mladen Von Tarnik

United States Patent Office 2,861,347
Patented Nov. 25, 1958

2,861,347

RETRACTABLE PLUG OR THREAD GAUGE

Mladen Von Tarnik, Chicago, Ill.

Application February 4, 1957, Serial No. 638,094

4 Claims. (Cl. 33—178)

This invention relates to improvements in a retractable plug or thread gauge, and more particularly to the type of plug gauge commonly known as a maximum and minimum gauge, highly desirable for use in connection with the testing of accurately drilled holes, whether or not the holes are threaded interiorly, although the invention may have other uses and purposes as will be apparent to one skilled in the art.

In the past, many and various types of plug gauges have ben developed, but these formerly known gauges did not possess a sufficient number of desiderata of plug gauges. In each case desired features were missing from the overall structure. For example, if a gauge member was retractable into the handle for protection when not in use it was not automatically retractable upon release of a holding member, and two such gauge members were not incorporated with the same handle, of if one or more of these features were present, the gauge member or members was not reversible. In short, some desideratum was lacking in heretofore known gauges which added to the difficulty of use of the gauge or materially shortened the life of the costly gauge members.

With the foregoing in mind, it is an important object of the instant invention to provide a plug gauge which includes a hollow single handle with a gauge member on it in each end of the handle in a manner to permit each gauge member to be retracted fully in the handle for protective purposes when the gauge is not in actual use.

Another object of the invention resides in the provision of a gauge member comprising a hollow handle with a gauge of a different size extending from each end of that handle, the gauge members being readily adjustable to extend a desired distance without the handle, or be retracted fully within the handle.

Also a feature of this invention is the provision of a plug gauge comprising a single hollow handle having longitudinal slots therein, with slidable gauge holding means in the handle adjacent each end thereof having locking elements extending through the slots, such means being so constructed as to hold a gauge member without injury thereto, whereby when the free end of the gauge member has become worn through usage, the gauge member may be reversed and the unused end then used for gauging purposes.

Still another feature of the instant invention resides in the provision of a plug gauge which comprises a hollow handle having a gauge member projectable from each end thereof, there being resilient means inside the handle urging both gauge members inwardly at all times, with means provided for selectively anchoring each gauge member in a desired degree of extension from the handle.

While some of the more salient features, characteristics and advantages of the instant invention have been above pointed out, others will become apparent from the following disclosures, taken in conjunction with the accompanying drawing, in which Fig. 1 is an elevational view of a plug gauge embodying principles of the instant invention, showing the gauge members extended from the handle different distances;

Figure 1:
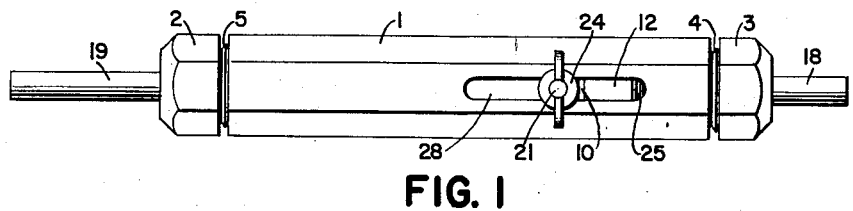

In the first illustrated embodiment of the instant invention, there is shown a plug gauge comprising a hollow handle 1 which may be polygonal in cross-section, or otherwise formed to insure a good grip by the hand of the user. This handle is provided with a smooth cylindrical bore 30 extending entirely through the handle, which bore is of uniform diameter throughout. The ends of the handle 1 are preferably closed by means of centrally apertured cap nuts 2 and 3, the cap nut 3 being threadedly engaged with a reduced threaded end portion 4 of the handle, and the cap nut 2 being similarly engaged with a reduced threaded end portion 5 of the handle. The cap nut 3 has an interior annular groove 8 in the head thereof to function as a spring seat, and the can nut 2 is similarly provided with a spring seat 9.

The handle member 1 is suitably provided with a pair of slots 28 and 29 through the wall thereof. Preferably, these slots are on opposite sides of the handle, the slot 28 extending substantially from the center point of the handle toward one end thereof, while the slot 29 extends substantially from the center point of the handle toward the opposite end thereof.

Figure 4:
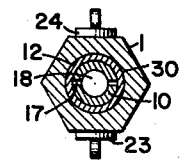
Fig. 4 is a transverse vertical sectional view taken substantially as indicated by the line A—A of Fig. 2, looking in the direction of the arrows.

Inside the handle in the region of the slot 28 is a collet bushing 10, split as at 17 (Fig. 4) to define a pair of externally threaded tapering jaws leading from a cylindrical head portion that is slidable within the bore 30 of the handle 1 in the manner of a piston. Another collet bushing 11 is slidable in similar manner in the handle in the region of the slot 29. The collet bushing 10 is engaged by an elongated tubular nut 12 having an interior tapered thread corresponding with the exterior thread on the bushing. A similar nut 13 is engaged on the collet bushing 11, and each of the nuts 12 and 13 may be provided with opposed flattened portions as indicated at 14 in Fig. 2, and the heads of the collet bushings may be provided with similar flattened portions as indicated at 15 to facilitate tightening of the respective nut on the bushing by means of wrenches, pliers or equivalent tools. Each of the tubular nuts 12 and 13 is preferably provided with an annular groove in the outer end thereof, as indicated at 16 in Fig. 2, which groove functions as a spring seat. Between the nut 12 and the cap nut 3 on the handle is a coil spring 25 which seats in the spring seat 8 of the cap nut 3 and also in the aforesaid spring seat 16 in the tubular nut 12. This spring urges the nut 12 and collet bushing inwardly. In similar manner, a spring 26 is mounted between the cap nut 2 and the nut 13 on the collet bushing 11, this spring also urging the respective nut and collet bushing inwardly.

Figure 2:
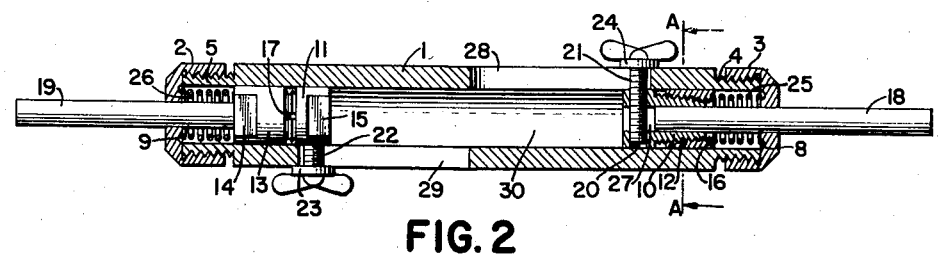
Fig. 2 is a longitudinal sectional view through the structure of Fig. 1, with parts shown in elevation, and showing both gauge members fully extended.

A gauge member 18 in the form of a rod of uniform external diameter has one end engaged between the jaws of the collet bushing 10 and when in useful position as seen in Fig. 2, the gauge member projects through the central aperture in the cap nut 3. It will be noted that the jaws of the collet bushing do not in any manner injure the end of the rod so held, the jaws being smooth and curvate interiarly as is evident from the showing in Fig. 4, and so the rod is merely tightly frictionally held by virtue of the squeezing of the jaws by the nut 12. Thus, when the free end of the rod becomes worn through usage, it is a simple expedient to reverse the rod ends and place the worn end in the collet bushing 10, thereby utilizing the other end of the member as the gauge. This provides desired economy, in that the gauge member has what may be termed a double life.

In similar manner, a gauge member 19 is held by the collet bushing 11 and nut 13 and extends through the central aperture in the cap nut 2 at the opposite end of the handle 1. Usually, the gauge member 19 has a slightly different diameter than the gauge member 18.

With reference more particularly to Fig. 2, it will be noted that the cylindrical end of the collet bushing 10 is provided with a transverse tapered aperture 20 interiorly threaded to accommodate a bolt 21 having a shaped head for finger actuation. This bolt extends through the slot 28 in the handle 1 and carries a collar 24 for engagement with the outside face of the handle. When this bolt is tightened, the collet bushing is held in a position of adjustment against the action of the spring 25 and with the gauge member 18 exposed. Release of the bolt 21 permits the spring to force the collet member inwardly and retract the gauge member 18 fully within the handle, where it is adequately protected against accidental injury when not in use.

Similarly, the collet bushing 11 is provided with a like bolt 22 having a collar 23 for bearing against the outside of the handle 1. It will be especially noted, therefore, that by suitable adjustment of the bolts 21 and 22, either gauge member 18 or 19 may be extended out of the handle 1 a desired amount. In some instances of use, full extension is necessary, whereas in other instances a partial extension such as the gauge member 18 as shown in Fig. 1 is more adequate for a particular purpose. It will also be noted that the gauge members are not accidentally exposed from the handle, because they must be moved outwardly against the action of the springs 25 and 26, and then anchored in the desired extended position.

Figure 3:
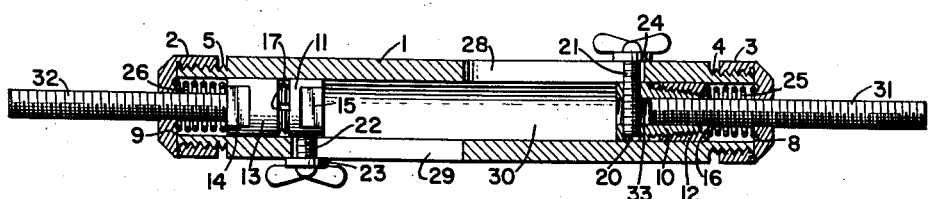
Fig. 3 is a view similar in character to Fig. 2, but illustrating different types of gauge members.

In Fig. 3, I have illustrated a slightly different embodiment of the instant invention, wherein the same structure with the exception of the gauge members and collet bushings, as above described, is employed. In this instance, however, the gauge members 31 and 32 are externally threaded for gauging accurately tapped holes and the collet bushings are internally threaded so as not to injure the threads on the gauge members. As in the previous instance, the gauge members are of slightly different sizes. The operation of the structure in Fig. 3 is otherwise the same as above described.

From the foregoing, it is apparent that I have provided both a plug gauge and a thread gauge each of which embodies but a single handle, with a gauge member extensible to a desired degree from either end thereof, the gauge members also being fully retractable with in the handle when not in use. Each of the gauge members is also reversible, since the holding means do not injure the gauge members in any respect, and the gauge members are constantly urged inwardly by spring pressure so that they cannot accidentally be exposed from the handle.

It will be understood that modifications and variations may be effected without departing from the scope of the novel concepts of the present invention.

I claim:

1. In a plug gauge, a hollow handle having a smooth interior bore, externally threaded ends on said handle, a centrally apertured cap nut on each said threaded end, a collet bushing in said handle adjacent each end thereof, a nut for each bushing, and a gauge bar held by each bushing and extending through the aperture in the respective cap nut, said bushings being slidable in the bore of said handle to expel and retract said gauge bars.

2. In a plug gauge, a hollow handle having a smooth interior bore and a longitudinal slot in the wall thereof adjacent each end, externally threaded ends on said handle, a centrally apertured cap nut on each said threaded end, a collet bushing and nut assembly in said handle adjacent each end thereof, and a gauge bar held by each assembly and extending through the aperture in the respective cap nut, said assemblies being slidable in the bore of said handle to expel and retract said gauge bars, means extending through the respective slot to lock each said assembly in a position of adjustment, and spring means between each assembly and the respective cap nut urging said assemblies inwardly to gauge bar retracted position.

3. In a plug gauge, a hollow handle having a smooth interior bore and a longitudinal slot in the wall thereof adjacent each end, externally threaded ends on said handle, a centrally apertured cap nut on each said threaded end, a collet bushing and nut assembly in said handle adjacent each end thereof, and a gauge bar held by each assembly and extending through the aperture in the respective cap nut, said assemblies being slidable in the bore of said handle to expel and retract said gauge bars, means extending through the respective slot to lock each said assembly in a position of adjustment, said gauge bars being of different sizes and each being reversible.

4. In a thread gauge, a hollow handle having a smooth interior bore and a longitudinal slot in the wall thereof adjacent each end, externally threaded ends on said handle, a centrally apertured cap nut on each said threaded end, an internally threaded collet bushing and nut assembly in said handle adjacent each end thereof, and a threaded gauge bar held by each assembly and extending through the aperture in the respective cap nut, said assemblies being slidable in the bore of said handle to expel and retract said threaded gauge bars, means extending through the respective slot to lock each said assembly in a position of adjustment, spring means between each assembly and the respective cap nut urging said assemblies inwardly to threaded gauge bar retracted position, said threaded gauge bars being of different sizes and each being reversible.

References Cited in the file of this patent

UNITED STATES PATENTS

| | | |
|---|---|---|
| 423,284 | Smith | Mar. 11, 1890 |
| 1,626,176 | Atwood | Apr. 26, 1927 |
| 1,701,771 | Di Stefano | Feb. 12, 1929 |
| 2,311,477 | Semerak | Feb. 16, 1943 |
| 2,392,317 | Eisele | Jan. 8, 1946 |
| 2,789,356 | Blanks | Apr. 23, 1957 |

FOREIGN PATENTS

| | | |
|---|---|---|
| 64,106 | Denmark | Nov. 5, 1945 |
| 58,771 | France | Nov. 25, 1953 |